(12) United States Patent
Loher et al.

(10) Patent No.: US 8,055,456 B2
(45) Date of Patent: Nov. 8, 2011

(54) METHOD OF MONITORING AND/OR DETERMINING THE CONDITION OF A FORCE-MEASURING DEVICE, AND FORCE-MEASURING DEVICE

(75) Inventors: Urs Loher, Widen (CH); Kurt Jensen, Wollerau (CH); Volker Ziebart, Wiesendangen (CH)

(73) Assignee: Mettler-Toledo AG, Greifensee (CH)

(*) Notice: Subject to any disclaimer, the term of this patent is extended or adjusted under 35 U.S.C. 154(b) by 192 days.

(21) Appl. No.: 12/559,138

(22) Filed: Sep. 14, 2009

(65) Prior Publication Data
US 2010/0004876 A1 Jan. 7, 2010

Related U.S. Application Data

(63) Continuation of application No. PCT/EP2008/052774, filed on Mar. 7, 2008.

(30) Foreign Application Priority Data
Mar. 23, 2007 (DE) .......................... 10 2007 014 711

(51) Int. Cl.
*G01L 1/00* (2006.01)

(52) U.S. Cl. ............ 702/41; 702/116; 702/34; 702/105; 702/101; 702/173; 702/174; 73/865.9; 73/25.03; 73/204.11; 324/207.11; 324/228; 177/229; 177/1; 177/50

(58) Field of Classification Search ............... 702/34, 702/116, 41, 62, 64, 105, 150, 178, 188, 702/101, 173, 182, 102, 174; 73/865.9, 715, 73/861.354, 862.69, 862.621, 149, 25.03, 73/745; 324/207.11, 228; 177/229, 1, 50
See application file for complete search history.

(56) References Cited

U.S. PATENT DOCUMENTS

| | | | |
|---|---|---|---|
| 4,002,854 A * | 1/1977 | Penrose | 379/388.05 |
| 4,574,639 A * | 3/1986 | Ward | 73/702 |
| 5,056,050 A | 10/1991 | Fuchs et al. | |
| 6,923,449 B2 | 8/2005 | Burkhard et al. | |
| 7,258,014 B2 * | 8/2007 | Rudkin | 73/702 |
| 7,398,681 B2 * | 7/2008 | Norbeck et al. | 73/204.11 |
| 7,497,137 B2 * | 3/2009 | Tellenbach et al. | 73/865.9 |
| 7,516,035 B2 * | 4/2009 | Tellenbach et al. | 702/105 |
| 2005/0081641 A1 | 4/2005 | Loher et al. | |
| 2006/0070890 A1 * | 4/2006 | Itoh | 205/775 |
| 2006/0169063 A1 | 8/2006 | Loher et al. | |
| 2007/0007050 A1 * | 1/2007 | Reber et al. | 177/212 |
| 2007/0010960 A1 * | 1/2007 | Tellenbach et al. | 702/105 |
| 2007/0119226 A1 * | 5/2007 | Tellenbach et al. | 73/1.15 |
| 2008/0078254 A1 * | 4/2008 | Sautter et al. | 73/862.69 |
| 2008/0110681 A1 * | 5/2008 | Von Arb et al. | 177/25.13 |
| 2008/0210018 A1 * | 9/2008 | Kahle | 73/861.354 |
| 2010/0013465 A1 * | 1/2010 | Sautter et al. | 324/207.11 |
| 2010/0044119 A1 * | 2/2010 | Burkhard et al. | 177/229 |

* cited by examiner

Primary Examiner — Carol Tsai
(74) Attorney, Agent, or Firm — Standley Law Group LLP

(57) ABSTRACT

An interior space of the at least one housing of a force-measuring device is filled with a gas composition that is distinguishable in at least one parameter from the ambient atmosphere. A sensor that is arranged in the interior space, or on the housing, measures this distinguishable parameter. A processing unit of the force-measuring device compares signals obtained from the sensor to monitor and determine the condition of the force-measuring device.

19 Claims, 4 Drawing Sheets

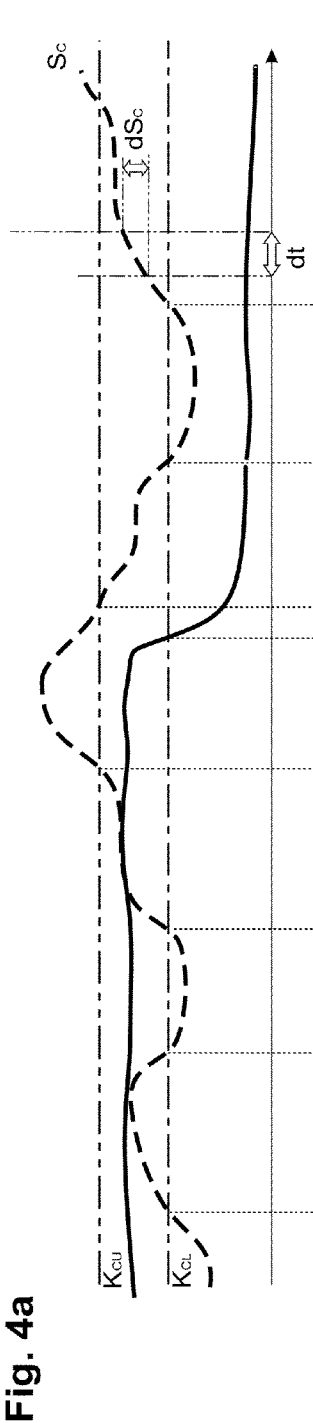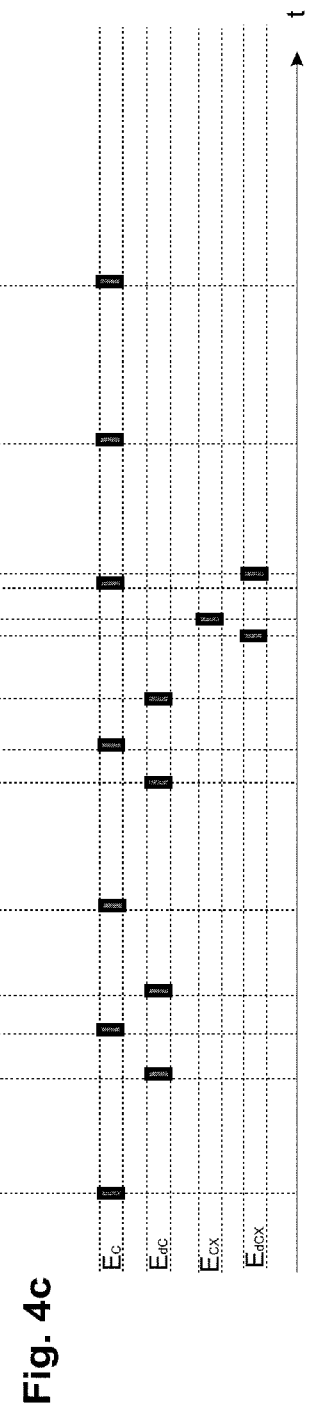
Fig. 4a
Fig. 4b
Fig. 4c

METHOD OF MONITORING AND/OR DETERMINING THE CONDITION OF A FORCE-MEASURING DEVICE, AND FORCE-MEASURING DEVICE

CROSS-REFERENCE TO RELATED APPLICATIONS

This application is a continuation under 35 USC §120 of PCT/EP2008/052774, filed 7 Mar. 2008, which is in turn entitled to benefit of a right of priority under 35 USC §119 from European patent application 102007014711, filed 23 Sep. 2007. The content of each of the applications is incorporated by reference as if fully recited herein.

TECHNICAL FIELD

The disclosed embodiments define a method whereby the condition of a force-measuring device can be monitored or determined. The force-measuring device has at least one housing with an interior space in which at least one force-measuring cell is installed. The disclosure further concerns a force-measuring device that is suitable to carry out the method.

BACKGROUND OF THE ART

The term "force-measuring cell" means a measurement transducer which converts a force presented as an input quantity for example into an electrical signal as an output quantity. Specifically, a force-measuring cell designed as a weighing cell serves to perform the electro-mechanical conversion of the weight force exerted by a weighing object into an electrical signal.

Many force-measuring devices, in particular gravimetric measuring instruments such as for example balances, thermogravimetric instruments, measuring instruments for gravimetric moisture determination, weighing modules for tank installations and reactor vessels, weighing modules and multi-module systems in filling- and packaging machines, and also torque-acceleration-measuring devices are in some cases used in very aggressive environments, and effective measures are therefore taken to protect them against destruction. Such protective measures include housings adapted to the operating environment which have to meet requirements in regard to the penetration of dust, moisture and the like, as codified for example under the so-called ingress protection ratings according to the European Norm Standard EN 60529.

The housing has an interior space in which sensitive components are arranged, such as electro-mechanical measurement transducers, sensors and electronic components for the signal processing circuits, and also sensitive mechanical devices such as for example force-transmitting devices or lever mechanisms. In a force-measuring device which generates a counter-acting force in opposition to the external force, as for example in a force-measuring device that is based on the principle of electro-magnetic force compensation, the force-generating device and its feedback control device are normally also arranged in the interior space of the housing, as these components are very sensitive to extraneous disturbances.

Furthermore, in the case of a force-measuring device of the last-mentioned type, the external force acting on the electro-mechanical measurement transducer that is arranged in the interior space as well as a counter-acting force are transmitted through a passage in the housing wall which may in some cases be configured as a diaphragm. This function is normally performed by a force-transmitting device such as a rod which should, however, be encumbered as little as possible by the housing.

High-capacity force-measuring cells for weighing modules, so-called tank- or reactor vessel weighing modules are installed for example in stainless steel housings that are closed off by gas-tight welds. The force-measuring cells enclosed in such housings operate without problems as long as the housing keeps the force-measuring cell isolated from ambient factors which have a harmful influence on the weighing signal. If there is a leak in the housing, the force-measuring cells are in most cases not instantly destroyed; rather, the destruction occurs gradually and is often noticed only at an advanced stage. If the measurement device is installed in industrial systems with a high degree of automation, a failure of the measuring device can lead to a long downtime period of the system or can cause defective products.

High-capacity force-measuring cells also find application as weighing modules in scales for trucks. Typically, a weighing system of this kind has several weighing platforms, each of which is supported by four weighing modules. These scales are normally used outdoors and are therefore particularly exposed to changing environmental conditions. In addition, the exposure entails the immediate risk that these weighing modules can be hampered in their ability to function correctly due to improper manipulations such as intentional, negligent or erroneous acts of mistreatment or intrusion.

Depending on the ambient conditions, the force-measuring devices do not necessarily have to be hermetically encapsulated. Less complicated and expensive housings with contact-free passages in the form of a labyrinth baffle as disclosed for example in DE 101 49 606 C2 can also be used in an industrial environment. Normal scale housings, too, will meet the purpose if they are compatible with the ambient conditions. However, in case of a manipulation error it is possible that for example a liquid may penetrate into the interior of the housing, whereby the relative humidity in the interior space of the housing may increase to such an extent as to cause corrosion of the force-measuring cell or electronic components of the signal-processing circuitry.

In many instances, force-measuring devices are transported over large distances and intermediately stored before being put into service. If the devices are exposed to inappropriate ambient conditions during transportation and storage, it is possible that condensation will occur in the interior of the housing which can critically compromise the measurement performance.

To conduct an inspection of the force-measuring cell involves a major undertaking or may even be impossible, depending on the housing in which the force-measuring cell is enclosed. A periodic examination of the force-measuring devices used in systems is complicated and expensive to perform.

A force-measuring cell which is disclosed in EP 1 347 277 B1 is additionally equipped with a temperature sensor. The analog signals of the force-measuring cell are converted by means of a first converter circuit and the analog signals produced by the temperature sensor are converted by means of a second converter circuit into two-level, pulse width-modulated signals. These signals are transmitted through connector leads to a processor module where they are further processed by means of compensation data that can be called up from a memory module. As a result of processing the force-measuring cell signals with the temperature sensor signals, the temperature drift of the weighing cell is corrected. While this kind of treatment of the weighing signal provides an adequate compensation for the effects of the ambient environment on the weighing signal, the actual condition of the force-measuring cell cannot be determined by it.

SUMMARY

The disclosed devices and methods therefore have the objective to provide a simple and cost-effective method of monitoring and/or determining the condition of a force-measuring cell that is arranged inside a housing.

This task is solved by a method and a force-measuring device with the features specified in the independent methods claim and in the independent apparatus claim. Advantageous further developed embodiments are presented in additional, dependent claims.

In a method of monitoring and/or determining the condition of a force-measuring device with at least one housing enclosing an interior space and with at least one force-measuring cell installed in the interior space of the at least one housing, the interior space is filled with a gas that is distinguishable from the gas of the outside atmosphere; at least one parameter or a parameter change of the composition of the gas in the interior space is measured, and based on the measurement at least one corresponding sensor signal is formed.

An opening in the housing, for example due to a leak or a manipulation, typically causes an increased atmospheric exchange between the gas in the interior space and the gas of the outside atmosphere around the housing. This exchange occurs as a result of gas escaping from the interior space and/or gas entering from the ambient atmosphere. Depending on the condition and composition of the inside and outside gases and the size of the opening, this gas exchange occurs more or less rapidly.

Consequently, as there is typically a direct connection between the gas composition and the integrity of the housing, this offers a simple way to achieve the objective of monitoring and/or determining the condition of the housing and thus the condition of the force-measuring device.

The gas composition in the interior space of the housing can further affect the useful life of the force-measuring device. For example, high oxygen content or aggressive vapor components can accelerate the processes of oxidation, corrosion or aging of the force-measuring device. By measuring the gas composition, it is therefore possible to predict the service life of the force-measuring cell.

Furthermore, the condition of the force-measuring cell can not only be determined from the parameter itself that characterizes the gas composition but also from the change of this parameter. On the one hand, this avoids having to contend with the sensor signal being dependent on the absolute magnitude of the parameter of the gas composition, while it allows on the other hand to distinguish more clearly between a slow change of the gas composition, for example due to a gas exchange through a housing seal, and fast changes of the gas composition that can be caused for example by corrosion or by tampering with the housing.

A preferred embodiment includes a processing step in which the sensor signal is stored in a memory unit and/or transmitted to a computing unit and/or to an output device. By storing the signal in memory, the condition of the force-measuring device can also be monitored during an interruption of the transmission. The stored values can in this case be retrieved at a later time, for example in the course of maintenance, repair, or forensic investigations, and transmitted to a computing unit and/or an output device for processing.

By transmitting the sensor signal or the stored values to a computing unit and/or to an output device, a labor- and cost-intensive manual inspection of the force-measuring device can be avoided.

If the parameter of the gas composition also affects the weighing signal of the force-measuring device, a sensor signal corresponding to the measured parameter of the atmosphere of the interior space can be sent by an additional sensor to the computing unit where it can be compared to an upper and/or a lower limit value of the usable range. If one of these limits of the usable range is crossed, the sensor signal or an output signal of the computing unit is transmitted to an output device.

Of course, the parameter of the gas composition can also be determined continuously, periodically, and/or at random.

A continuous registration of the sensor signals has the advantage that the entire signal history of the sensor is available, which provides information on the intensity and duration of the parameter of the gas composition of the force-measuring cell, so that the signal history can be used to determine the condition and/or to calculate the remaining operating life.

An "at random" determination in this context means that the trigger command to register or produce a signal is not given according to a fixed time sequence but is initialized for example by a random generator or by the user. This initialization can cause the registering of an individual signal or also start a periodic registering of the signal over a predetermined time period.

In a further embodiment, the sensor signal and/or a signal produced in the processing step is compared to at least one threshold value. After at least one decision criterion has been met, at least one corresponding event is registered and transmitted to a memory unit and/or to a computing unit and/or to an output device. The volume of data to be stored or transmitted can thereby be reduced to a minimum. These events are preferably labeled with a globally unique identifier of the force-measuring device and/or of the sensor as well as with a certified time stamp and/or an identifier of the geographic location.

The term "computing unit" as used herein encompasses all signal-processing elements such as analog circuits, digital circuits, integrated circuits, processors, computers and the like, wherein the sensor signals generated by the sensor are compared to values that are already stored or set in the sensor or in the computing unit. These values, in particular maximum values, threshold values and limit values of the usable range may come from regulatory codes such as national or international standards, they may have been determined from comparison measurements, or they may have been established by the manufacturer of the force-measuring device.

Maximum values and threshold values are in most cases dependent on the design of the force-measuring device and are established normally by the manufacturer, possibly also by the user. Threshold values can represent limit values for certain symptoms which, if exceeded, can lead to permanent damage of the force measuring device which will in principle, however, not make the force-measuring device unusable. If the force-measuring device is recalibrated after the limit value has been exceeded, the change can be compensated. Repeated occurrences of exceeding the threshold value can cause a stepwise destruction of the force-measuring device until a condition is reached which can no longer be compensated by means of a calibration. This condition is expressed and represented by the maximum value. Of course, a maximum value can also be reached through a one-time event if the gas composition in the interior space of the housing changes very strongly or if other extraneous factors such as shock impacts lead to the destruction of the force-measuring device.

Besides maximum values and threshold values, there are limit values defining the range of variation for the characteristic values of the atmosphere in the interior space within which the force-measuring cell may be operated without violating the permissible tolerance limits for the measurement result of the force-measuring device. They can be stored in appropriate form in the computing unit. If needed, the force-measuring device can also include a plurality of computing units, for example an individual dedicated computing unit for each of the installed sensors.

The term "output device" is used for all transmitting-, signaling- and warning systems that are suitable for the function of representing the sensor signals of a parameter of the gas composition or representing an output signal of the computing unit through appropriate means such as sound, light, vibrations, electrical signals, electromagnetic pulses, numerical outputs and the like, or transmitting them to other devices, for example further output devices, lead computer systems, terminals and the like. The output device can therefore also be a transponder or transmitter which sends the sensor signals and/or output signals for example to a portable device. By means of the output device, a warning can be given to the user, the event record can be sent on to a memory unit, or it is even conceivable to alert the manufacturer or its service facility directly, for example through internet connections.

All sensors can be active systems which automatically detect a change and store a sensor signal or a registered event and/or forward the signal or event record to the computing unit and/or to the output device. However, it is also possible to use passive sensors, in which case the sensor signals or the stored values are periodically interrogated by the computing unit. The data acquired in this manner already allow a coarse calculation of the remaining operating life by subtracting a predefined amount from the predefined operating life for each violation of a threshold value or maximum value. By registering the sensor signals continuously, analogous to a time profile of a signal, and with the simultaneously recorded time segments, it is possible to calculate the remaining operating life very accurately.

The inventive arrangement of at least one sensor inside the weighing cell housing thus allows the current condition of the weighing cell to be determined and—if any of several threshold values have been exceeded—also allows the remaining operating life to be calculated. To perform this function, the sensor signal determined by a sensor is compared in the computing unit to at least one threshold value, and after a threshold value has been crossed:

a) a corresponding load exposure is registered;
b) a corresponding load exposure is registered, and the sum of all load exposures is calculated, or
c) a corresponding load exposure is registered, the sum of all load exposures is calculated, and through comparison with a maximum value of the permissible load exposures, a permissible remaining load exposure or remaining operating live is calculated.

The sum of the load exposures and/or the remaining operating life can either be recalled by way of the output device from the computing unit or the memory unit, or the computing unit automatically transmits this information to the output device in the form of output signals every time a corresponding load exposure is registered. This output signal can trigger different actions such as an alarm or a calibration, or it can interrupt the measurement process of the force-measuring device.

In principle, the location where the sensor is installed inside the housing is irrelevant. It can be attached to the inside of the weighing cell housing or to the weighing cell itself or, for example, it could also be incorporated in the circuit board of the signal-processing device. It is even conceivable to arrange the sensor on the outside of the weighing cell housing, provided there is a suitable connection between the interior space and the sensor in order to register a corresponding parameter of the gas composition with sufficient accuracy. For example, the sensor can be attached to the outside of the housing if there is a sufficient exchange of gas between the interior space and the sensor.

In a particularly preferred embodiment, the sum of all load exposures of the force-measuring cell is determined by an integration of:

d) the entire time profile of the sensor signals of the at least one sensor or
e) the time profile of the sensor signals of the at least one sensor after a threshold value has been crossed, or
f) the time segments during which the sensor signals of the at least one sensor lie beyond the threshold values.

The result of the integration is stored and after the maximum value has been exceeded, the condition of the force-measuring cell or the occurrence of exceeding the maximum value is stored and/or transmitted to the output device.

The sensor signal delivered to the output device or the output signal of the computing unit can trigger different actions such as issuing an alarm, for example through a warning system or a reporting system, and/or it can interrupt a measurement process of the force-measuring device. It is also conceivable that an operation-readiness indication is canceled, which would otherwise show the force-measuring device to be ready for operation.

In a further developed embodiment, the at least one sensor signal or the output signal can also trigger an automatic calibration process of the force-measuring cell or it can request that a manual calibration be performed by the user or the manufacturer.

In a preferred further developed version of the method, the at least one sensor is being validated by at least periodically checking its sensor signals that are transmitted to the computing unit, wherein the checking consists of comparing the sensor signals in the computing unit with the verification values and verification tolerance values that are stored in the computing unit or produced by the computing unit. If the verification values and/or verification tolerance values are found to be violated, an error is registered and transmitted to the output device. The verification values depend on the sensor being used and are in most cases provided by the manufacturer of the sensor. For example, if during operation of the force-measuring device the sensor delivers a sensor signal which is incompatible with the physical reality, this is recognized through the verification of the sensor signals in the computing unit. Furthermore, the verification values and verification tolerance values can also be established and/or adjusted on the basis of preceding sensor signals or by means of the sensor signals of further sensors.

In a particularly preferred further developed version, at least one sensor signal is determined at the factory prior to the delivery of the force-measuring device, this sensor signal is processed in the computer unit and stored as a reference value. At least after delivery of the force-measuring cell, at least one sensor signal is determined by the sensor associated with the reference signal, this sensor signal is expressed as a sensor measurement value, and the sensor measurement value is compared to the reference value. This procedure can serve to check whether or not the force-measuring device has been opened.

The force-measuring device preferably has an independent power supply, in particular a back-up battery. This allows an uninterrupted supply of power to the central electronic components, in particular to the components of the sensor, the memory unit and the computing unit, so that the condition of the force-measuring device can be monitored continuously and the condition can be monitored and registered also at times other than the actual operation, i.e. for example during transportation, storage, installation, and also during repairs and any kind of manipulation.

The disclosed device is a force-measuring device with at least one housing that has an interior space in which at least one force-measuring cell is installed and which contains a gas that is distinguishable from the gas of the outside atmosphere. At least one sensor which is arranged in the interior space of the housing and/or at least one sensor arranged on the housing serves to measure at least one parameter and/or parameter change of the gas composition of the gas contained in the interior space and to generate at least one corresponding sensor signal based on said parameter or parameter change.

In a preferred embodiment, the sensor signal can be transmitted to a processing device, in particular to a memory unit and/or a computing unit and/or an output device.

In at least one configuration, the at least one sensor includes a trigger element whose function corresponds to at least one threshold value and/or at least one limit value of the usable range as a function of at least one parameter of the gas composition. In place of the sensor with the trigger element, the force-measuring device can also be equipped with at least one sensor and at least one computing unit and/or an output unit containing the output device and/or a measurement converter as well as an operating program performing the trigger function, wherein the operating program includes at least one threshold value and/or at least one limit value of the usable range as a function of at least one parameter of the gas composition, and/or wherein the operating program includes at least one command sequence serving to call up at least one threshold value and/or a limit value of the usable range and/or a maximum value from a memory module. The combination of a sensor with a trigger element and a computing unit with an operating program is of course also included in the range of possibilities.

Preferably, a sensor signal set off by the trigger element is stored in a memory unit and/or transmitted to a computing unit and/or to an output device. The trigger element itself can be designed in different ways, for example in the form of a catalytic trigger which is set off when a certain gas composition is present. Of course, the trigger element can also be configured as an analog circuit using electronic components such as comparator elements or as a digital circuit with a microprocessor.

An output signal of the computing unit which is triggered by the operating program can also be designed to be transmitted to an output device and/or to a further computing unit. If a microprocessor is part of the computing unit of the force-measuring device and/or of an output unit containing the output device and/or of a measurement converter connected to the sensor, it is possible to implement some or several or all of the procedural steps of the process in an operating program which is stored in at least one memory unit that communicates with the force-measuring device at least part of the time.

In one embodiment, the operating program described above does not necessarily have to reside in the processor, but can be called up when needed from a memory unit outside the force-measuring device and uploaded to the respective processor.

In one embodiment, the computing unit and/or an output unit containing the output device is connected to the at least one sensor through either a wireless or a wire-bound transmission.

In an advantageously configured embodiment, at least one sensor is of a design where a memory module and/or a measurement converter is incorporated in the sensor. It is also possible that the force-measuring device includes a memory unit which serves to store the sensor signal and/or a sensor signal generated in the processing step and/or the registration of an event related to the sensor signal and/or to the sensor signal generated in the processing step.

In one embodiment, the force-measuring device includes at least one independent power supply, in particular a back-up battery with the capability to supply the electronic components of the force-measuring device, in particular the sensor, the memory unit and the computing unit.

The sensor is preferably designed to measure the thermal conductivity of at least one of the gas components of the gas composition. As sensors of this kind can be made in cost-effective miniaturized configurations, in particular as integrated circuits, this approach provides a robust, cost-effective and reliable solution for the monitoring function, requiring only an insignificant amount of additional space.

In a further embodiment, the housing is sealed to a large extent against the ambient atmosphere, for example by a labyrinth baffle or by a hermetic seal. With this concept, the exchange of the gases in the interior space with the gases of the ambient atmosphere can be reduced to the point where concentration changes remain within an acceptable range as long as the housing is intact, and clearly noticeable changes of the gas composition occur only after the housing has suffered from damage or abusive manipulation.

The concept of a seal therefore has to be seen in the context of the situation. While it is in particular not possible to achieve an absolutely gas-tight seal with a labyrinth baffle, the gas exchange can be kept to a minimum with this type of seal.

As a further factor in reducing the exchange of gas, the gas pressure in the interior space is largely matched to the ambient atmospheric pressure. In some cases, this is achieved with a pressure-equalizing device, in particular a diaphragm. Due to this high degree of equalization, the pressure difference and thus also the driving force of the gas exchange is practically reduced to zero or to an acceptable level. In this case, too, the effects of damage or abusive manipulation on the housing will be evident from unmistakable changes of the gas composition which can be detected by means of the sensor.

Furthermore, with a sealed housing, the sensor signals for the gas concentration prior to delivery from the manufacturer and after the installation at the customer's location can be compared to each other, whereby it is possible to determine whether or not the force-measuring device has been opened in the time between. This aspect is particularly important in the case of force-measuring devices that are subject to official verification and represents an additional safety factor besides the calibration seal.

The interior space of the housing is preferably filled with a gas in which the thermal conductivity of at least one gas component of the gas composition is clearly different from the thermal conductivity of the atmosphere that surrounds the force-measuring device. The sensor to be used in this case can be a thermal conductivity sensor for gases which is capable of detecting the change of the gas composition parameter in the interior space which occurs as a consequence of a leak in the housing and/or which periodically and/or at random or continuously generates a sensor signal corresponding to the parameter of the gas composition.

The gas composition can in particular consist of the components argon and helium. These gases have a thermal conductivity that differs significantly from air. Also, being inert gases, they provide additional protection against oxidation and/or corrosion for the sensitive components in the housing.

In addition to the at least one sensor, the force-measuring device can be equipped with a further sensor in the interior space of the housing or attached to the housing for the detection of power line surges in a power supply of the force-measuring cell or for the detection of the condition of an autonomous power supply, in particular to check the charge level of a back-up battery.

Also in addition to the at least one sensor, the force-measuring device can be equipped with a further sensor in the interior space of the housing or attached to the housing for the determination of a sensor signal that depends on the load cycles of the force-measuring cell.

However, instead of using an additional sensor, the mechanical load cycles can also be determined directly in the computing unit based on the weighing signal of the force-measuring cell.

The sensors of the force-measuring device can be configured in such a way that a memory module and/or a measurement converter and/or a transmitter is incorporated in each sensor.

BRIEF DESCRIPTION OF THE DRAWINGS

Details of the method and the force-measuring device will be apparent from the description of the embodiments shown in the drawings, wherein:

FIGS. 4a through 4c represent time profiles obtained from a sensor that is arranged in the interior space of the housing for the measurement of the gas composition, with FIG. 4a depicting the time profile of the sensor signal, FIG. 4b depicting the time profile of the changes of the sensor signal, and FIG. 4c depicting the registered occurrences when prescribed limit values were violated.

DETAILED DESCRIPTION OF THE EMBODIMENTS

Figure 1:
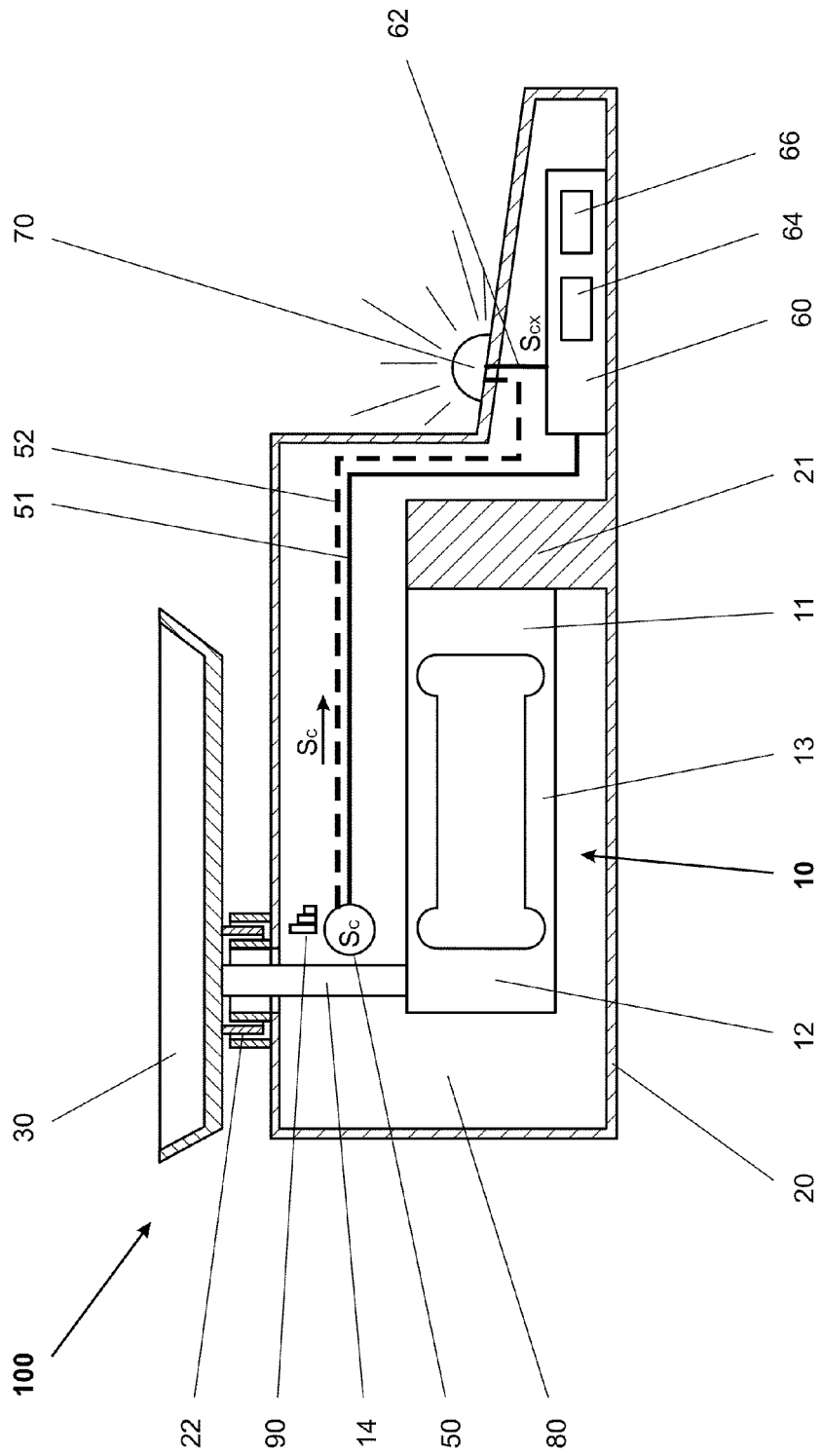
FIG. 1 schematically depicts a side sectional view of a force-measuring device in the form of a balance, with a housing that has an interior space and with a force-measuring cell arranged in the housing, wherein the interior space includes at least one sensor which serves to perform the described and claimed method.

FIG. 1 schematically illustrates a force-measuring device 100, specifically a balance, in a sectional view. A force-measuring cell 10 includes a stationary part 11 and a load-receiving part 12 that are connected to each other by a midsection 13. The force-measuring cell 10 is arranged in the interior space 80 of a housing 20 and its stationary part 11 is rigidly connected to the housing 20 by way of the support 21 which is a fixed part of the housing. A load receiver 30 in the form of a weighing pan which is arranged outside of the housing 20 is connected by way of a force-transmitting rod 14 to the load-receiving part 12 of the force-measuring cell 10 which is arranged in the interior space. By way of a passage opening 22, the force-transmitting rod 14 passes through the housing 20 without touching the latter. The passage opening 22 of the housing is configured in such a way that the penetration of dirt, dust and moisture is avoided as much as possible or is at least strongly reduced. Depending on the application, this purpose can also be achieved by setting the interior space 80 under a higher gas pressure than the ambient atmosphere of the force-measuring device 100. Furthermore, at least one sensor 50 is arranged in the interior space which registers at least one parameter of the gas composition 90 of the interior space and determines a corresponding sensor signal $S_C$. This sensor signal $S_C$ is transmitted for further processing by way of a computing unit connection 51 to a computing unit 60 and/or by way of an output device connection 52 to an output device 70. The computing unit 60 includes a memory unit 64 and an additional independent power supply unit 66 which can supply power to the sensor 50, the memory unit 64 and the computing unit 60 also during a separation from line power. The computing unit 60 is connected to the output device 70 by way of the computing-unit/output-device connection 62 and transmits the output signals $S_{CX}$ generated by the computing unit 60 to the output device 70. The latter can be arranged either directly on the outside of the housing 20 or in separation from the housing 20, or it can also be installed inside the housing, provided that the housing 20 is appropriately designed with sound-transmitting or transparent walls to allow the output signal to be seen or heard. Symbols and warning signals that are specifically tailored to the information or warning to be conveyed can enhance the impact of the message on a person. It is conceivable to use generally known pictograms known for example from traffic signs, or symbols that are specifically created for the corresponding warning message. Different degrees of importance of the warning or information can be indicated by varying the volume or pitch of audible output signals. Each of the connections 51, 52, 62 in the embodiment of FIG. 1 can be either a cable connection such as a signal cable, a bus system or the like, or a wireless connection.

As a sensor 50 for the measurement of the gas composition 90, a variety of different types are suitable. For example, it is possible to determine the gas composition from the partial pressure or the electrical conductivity. Spectroscopic methods are also conceivable.

Sensors for the measurement of the thermal conductivity have proven to be particularly advantageous. For example the "Micro Thermal Conductivity Sensor MTCS" made by Silsens SA, Neuchâtel, Switzerland, is particularly suitable for use in force-measuring devices. This sensor type can be used for gas mixtures with more than two components even in cases where one of the components of interest has a thermal conductivity that is significantly different from the thermal conductivity of the other components. These gas mixtures are referred to as quasi-binary mixtures.

As soon as a parameter of the gas composition 90 changes or exceeds the permissible value specified by the manufacturer, the result is registered and/or stored in the memory unit 64, and/or a sensor signal $S_C$ or an output signal $S_{CX}$ is transmitted to the output device 70 where it is appropriately indicated. This indication can consist of an audible alarm, an optical indication such as a blinking light, or a warning or information message presented on a display.

Figure 2:
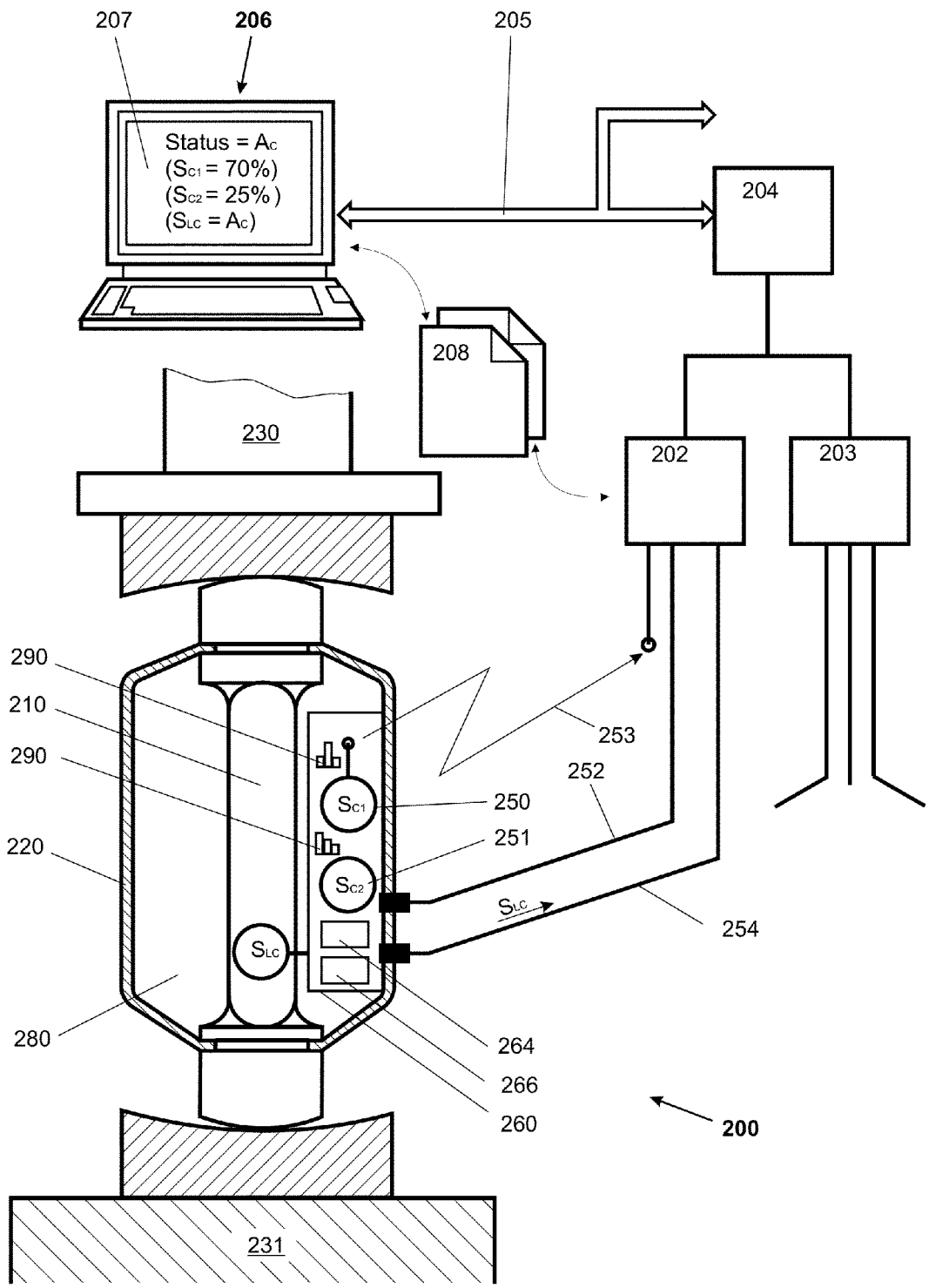
FIG. 2 schematically depicts a side sectional view of a force-measuring device in the form of a tank-weighing module shown in sectional view, with a housing that has an interior space and with a force-measuring cell arranged in the housing, wherein the interior space includes two sensors which serve to perform the method and which are connected by way of connecting devices to an output unit which is arranged outside of the housing.

FIG. 2 shows a force-measuring device 200 in the form of a tank-weighing module which is monitored according to the method. Tank-weighing modules are used in particular in industrial systems to weigh the contents of basins, tanks, reactor vessels and the like. In a normal situation, for each container to be weighed several weighing modules are arranged between the feet of the container 230 and the foundation 231. Thus, each foot of the container rests on a force-measuring device 200. In order to determine the weight of the container and/or its contents, the weighing signals $S_{LC}$ generated by the force-measuring devices 200 have to be added as they represent the respective weighing signals $S_{LC}$ for partial masses. For this reason, the force-measuring devices 200 in the form of weighing modules normally lack an output device. The weighing signals $S_{LC}$ of the individual force-measuring devices 200 of a container are for example transmitted to a computing unit 206 in the form of a lead computer where the signals are processed and presented on the output device 207 which is incorporated in the lead computer, in most cases as a part of a synoptic system display panel.

The force-measuring device 200 includes a force-measuring cell 210 which is enclosed by a housing 220. The housing 220 is normally welded together with the force-measuring cell 210 and tightly sealed off from the ambient environment of the force-measuring device 200. In the operation of performing a measurement, the force-measuring cell 210 and the housing 220 are elastically compressed. The influence that the elastic resistance of the housing has on the weighing signal $S_{LC}$ can be partially compensated, and the hysteresis of the weighing module in relation to the measuring range is negligible. The parameters of the gas composition in the interior space 290 are detected and/or measured by means of two sensors 250 and 251. For example, the first sensor can serve to measure the thermal conductivity of argon, and the second sensor can serve to measure the thermal conductivity of oxygen. These sensors 250, 251 are connected to a computing unit 206 through physical connections 252 and/or wireless connections 253, transmitters 202, measurement converters 203, a segment coupler 204 and a bus system 205. The weighing signal $S_{LC}$ of the force-measuring cell 210 can be transmitted either through these connections or through its own weighing signal connection 254 to the computing unit 206.

The force-measuring device 200 in FIG. 2 has two sensors 251 and 250 in the interior space of the housing 280. The sensors 250, 251, which can be operated independently of each other, have transmitted measurement values to the computing unit 206 which correspond to the gas composition 290 in the interior space. However, these measurement values could also have been collected at an earlier time, stored in the sensors 250, 251 or in the memory unit 264 and transmitted to the computing unit 206 at a later time. The sensors 250, 251, the memory unit 264 and possibly further electric components can be supplied by an additional, independent power source 266. The computing unit 206 in FIG. 2 is for example the lead computer of a process control system. The sensors automatically transmit corresponding sensor signals $S_{C1}$, $S_{C2}$ to the computing unit 206 either continuously or periodically and/or at random or after a change has occurred, depending on the configuration of the force-measuring device 200 and the computing unit 206. Of course, the computing unit 206 can also call up the sensor signals $S_{C1}$, $S_{C2}$ from the sensors 250, 251 continuously, periodically or at random. The sensors 250, 251 have detected a change of the parameters of the gas composition 290 in the interior space ($S_{C1}$=70%, $S_{C2}$=25%), which indicates a leak in the housing. As several force-measuring devices 200 are used for one container, the sensor signals $S_{C1}$, $S_{C2}$ of the other force-measuring devices 200 can be used to verify the signals $S_{C1}$, $S_{C2}$ of a force-measuring device 200. However, the values used for the verification can also have been previously stored in the sensor 250, 251 or in the computing unit 206. These values can for example come from published tables whose values have been established from other devices or are based on internet data. For example, data that are specific to the location of use of the force-measuring device such as the ranges for barometric pressure, temperature and radiation, or data on seismic vibrations, are known and can be used for the verification of the sensor signals. If a part of the sensor signals $S_{C1}$, $S_{C2}$ is stored in the computing unit 206 to establish a history, the analysis of these historical data can serve to gain additional knowledge about the condition of the force-measuring cells 210 as well as the sensors 251, 252. The verification values and the verification tolerance values depend on the sensor being used and are in most cases included in the delivery by the manufacturer. If during operation of the force-measuring device the sensor delivers for example a sensor signal $S_{C1}$, $S_{C2}$ which is implausible in view of the physical situation, this will be discovered through the verification of the sensor signals $S_{C1}$, $S_{C2}$ in the computing unit 206. Furthermore, the verification values and verification tolerance values can also be set and/or adjusted on the basis of preceding sensor signals $S_{C1}$, $S_{C2}$.

The method can be performed by means of centralized and/or decentralized parts of a control device of a system, for example with the computing unit 206 and/or the measurement converters or transmitters 202, 203, which are equipped for this purpose with the requisite operating programs 208. The condition of the sensor 250 can for example be displayed only on the output device 207 of the computing unit 206 or on the measurement converters or transmitters 202, 203. However, the tasks can also be divided between the different levels of the process control. With suitable measures, the inventive method can thus be implemented at modest expense in any single-level or multi-level system. The measurement converter and transmitter 202, 203 can also be installed in a mobile instrument with whose help the individual values of the sensors 250, 251 are called up through wireless connections 253. To realize this concept, the individual sensors 250, 251 have to carry an identifier code as known and practiced for many state-of-the-art applications.

Figure 3A:
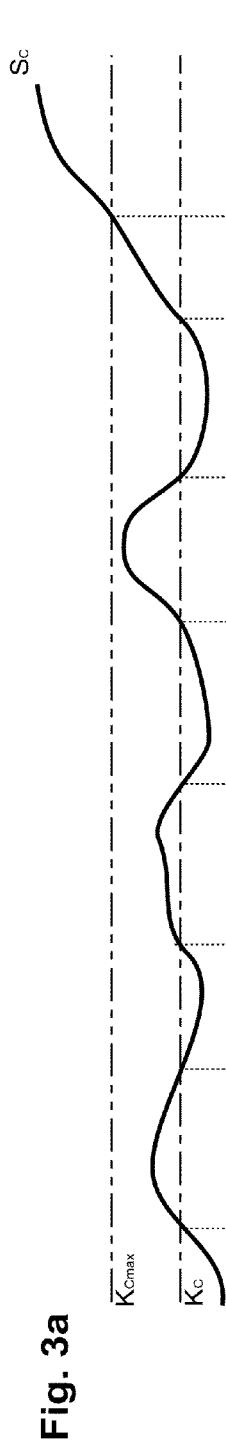
FIGS. 3a through 3c represent time profiles obtained from a sensor that is arranged in the interior space of the housing for the measurement of the gas composition, with FIG. 3a depicting the time profile of the sensor signal, FIG. 3b depicting the cumulative load exposure, and FIG. 3c depicting the output signals or output messages generated on the basis of the time profile of the sensor signal.

FIG. 3 shows the time graph formed of the continuously registered sensor signals $S_C$ of a parameter of the gas composition in the interior space of the housing of the sensor 50 of FIG. 1 and the output signals or output messages $A_C$, $A_M$, $A_D$ generated on the basis of the sensor signal $S_C$. The sensor time graph shown in FIG. 3a crosses a threshold value $K_C$ at the times $t_1$, $t_3$. When the limit represented by this threshold value $K_C$ is exceeded, the gas composition in the interior space deviates so far from the specified conditions that the corrosion in parts of the force-measuring cell 10 or of the signal-processing device will affect the weighing signal and the force-measuring cell will be gradually destroyed. The magnitude of the threshold value $K_C$ depends on the one hand on the gas composition in the interior space of the force-measuring device 100 and on the other hand on the aggressiveness of the penetrating medium and can be specified by the manufacturer on a case-by-case basis, for example:

| | |
|---|---|
| Argon concentration | 50% |
| Helium concentration | 25% |
| Oxygen concentration | 25% |
| Hydrogen concentration | 0.5 ppm |

Figure 3B:
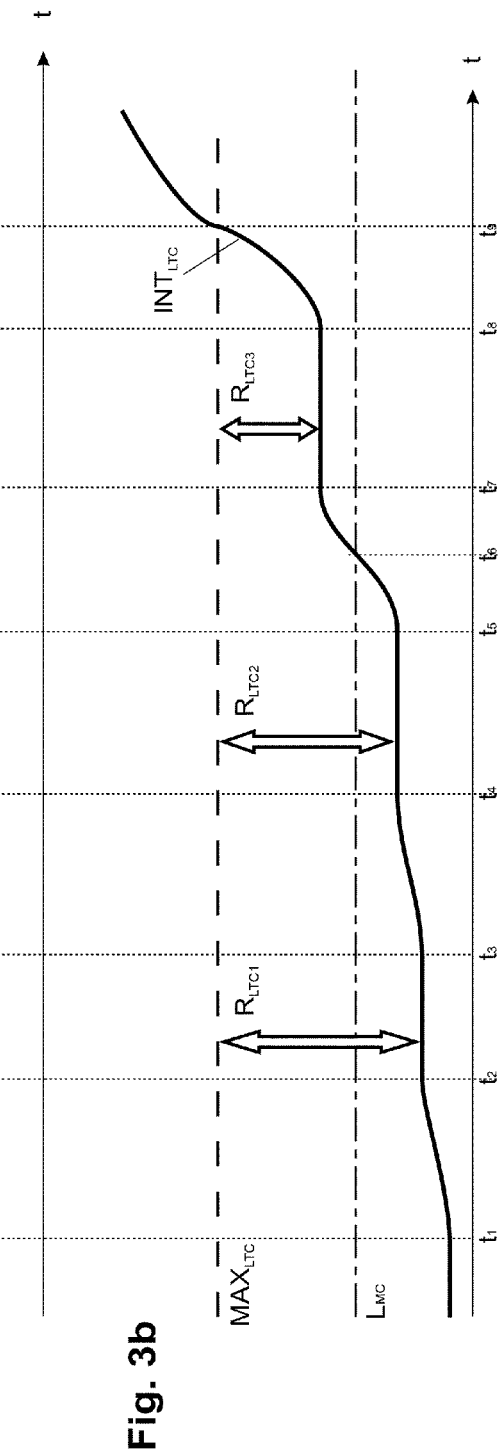
Figure 3C:
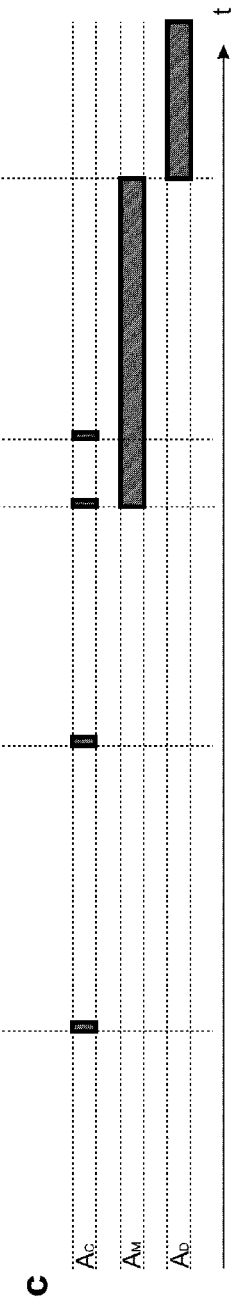

As soon as the threshold value $K_C$ is crossed again in the downward direction as at the time $t_2$, $t_4$, $t_7$, the condition is stabilized and the destruction in the interior space 80 of the force-measuring device 100 does not advance further. As shown in FIG. 3c, when the threshold value $K_C$ is crossed in the downward direction, a calibration $A_C$ can be requested by way of the output device, or a calibration can be initiated automatically.

It is further possible to define a maximum value $K_{Cmax}$ for example so that when the latter is exceeded, the force-measuring cell 10 and the electronic components will be destroyed within a very short time.

The excursions of the parameter value above the threshold value $K_b$ and the maximum value $K_{Cmax}$ over the respective time periods ($t_2$–$t_1$; $t_4$–$t_3$; $t_7$–$t_5$; . . . ) are registered and cumulatively added as load exposure $INT_{LTC}$ as shown in FIG. 3b. The cumulative exposure $INT_{LTC}$ is compared to the limit value $MAX_{LTC}$ of the operating life, which has been determined by experiments, and based on the comparison the remaining operating life $R_{LTC1}$, $RL_{TC2}$, $R_{LTC3}$ is calculated. The result is transmitted to the output device 70 or stored in the computing unit.

As shown in FIG. 3b, it is possible to define even further limit values. As an example, the maintenance service limit value $L_{MC}$ can be mentioned which, when exceeded, will trigger a warning and/or a request $A_M$ for servicing to the output device 70 (FIG. 3c). Furthermore, the crossing of the maintenance service limit value $L_{MC}$ at the time $t_6$ can trigger for example the blocking of the output of the measurement values of the force-measuring cell, the down-grading of the accuracy class of the balance, the tagging of measurement value printouts with warning messages and/or an automatic alert to the manufacturer through internet connections. This enumeration is not meant to be complete, as many other actions and output arrangements are possible.

As soon as the cumulative load exposure $INT_{LTC}$ exceeds the operating life limit value $MAX_{LTC}$, a corresponding signal value $A_D$ is transmitted to the output device to indicate the potentially final internal destruction of the force-measuring device. As a sensible measure, the signal value $A_D$ blocks the output device, thus stopping the further use of the force-measuring device.

FIG. 4 shows the time graph formed of the continuously registered sensor signals $S_C$ of a parameter of the gas composition as detected by a sensor that is arranged in the interior space of the housing as well as the output signals or registrations of the events $E_C$, $E_{dC}$ which are generated in the computing unit based on the sensor signals $S_C$. For part of the time the parameter of the gas composition in FIG. 4a falls below a lower threshold value $K_{CL}$ and part of the time it exceeds an upper threshold value $K_{CU}$.

Further, as shown in FIG. 4a, based on the time graph of the sensor signals $S_C$ one can determine the differential value $dS_C$ by taking the difference of two signal values that are separated by a time interval dt. The differentials $dS_C$ can be calculated for all segments of the signal graph $S_C$ and can likewise be compared to a lower threshold value $K_{dCL}$ and an upper threshold value $K_{dCU}$. The time graph for $dS_C$ likewise falls part of the time below and part of the time exceeds these threshold values, causing corresponding events $E_{dC}$ to be registered. The broken line represents the time profile of the measurement signal for the case of a changing gas composition in the interior space. This situation can occur for example when there is a change between different operating environments or during repair work and manipulations on the housing.

FIG. 4b shows the change of the signal profile $S_C$ over time. In the case of this graph, too, excursions above and below threshold values are being monitored. The broken-line graph corresponds to the broken-line graph of FIG. 4a.

FIG. 4c shows the record of the registered events $E_C$, $E_{dC}$, $E_{CX}$ and $E_{dCX}$ in a form in which they can for example be stored in the memory unit 66, 266 and/or transmitted to the computing unit 60, 260 and/or the output device 70. The events $E_{CX}$ and $E_{dCX}$ correspond to the signal profile drawn as a solid line, and the events $E_C$, $E_{dC}$ correspond to the signal profile drawn as a broken line in FIGS. 4a and 4b.

There are also further advantages which are only indirectly related to the determination of the operating condition. For example, suitable sensor signals generated by the at least one sensor can also be used to correct the measurement result in order to avoid the need to install additional measurement sensors of the kinds used according to the state of the art for example for the compensation of hysteresis- and/or drift effects.

It is further possible to store limit values for load exposure in suitable form in the computing unit. For example the following limit values of the usable range are specified for weighing equipment under the regulatory standard OIML R60:

| | |
|---|---|
| Barometric pressure limits | +95 kPa to +105 kPa |
| Temperature limits for Class II | +10° C. to +30° C. |
| Temperature limits for Class III | −10° C. to +40° C. |

The limit values of the usable range define the range of values for the climate in which the force-measuring cell may be operated without violating the permissible tolerances for the measurement results of the force-measuring device.

The embodiments described herein are not meant to imply that the present invention is limited to an arrangement with only one weighing cell in only one housing. As will be apparent to a person of ordinary competence in this field, the invention can be used also in arrangements that include at least two weighing cells in a housing. Furthermore, the coordination of measurements and warnings has no bearing on the subject of the invention. Messages or warnings can be delivered in real time as well as at a time that is separate from the measurements.

What is claimed is:

1. A method for monitoring and/or determining the condition of a force-measuring device having at least one housing that encloses an interior space and with at least one force-measuring cell installed in the interior space, comprising the steps of:
   providing the at least one housing with the interior space filled with a gas composition that is distinguishable from the gas composition of the outside atmosphere;
   measuring the thermal conductivity of the gas composition in the interior space by at least one sensor that is at least one of: arranged in the interior space and at the housing; and
   forming a corresponding sensor signal based on the sensor measurement.

2. The method of claim 1, further comprising the step of processing the sensor signal by at least one of:
   storing the sensor signal in a memory unit; and
   transmitting the sensor signal to at least one of: a computing unit and to an output device.

3. The method of claim 2, further comprising the step of:
   comparing, to at least one threshold value, at least one of the sensor signal and a signal produced in the processing step; and
   upon determining that at least one decision criterion has been met in the comparing step, registering at least one corresponding event and transmitting the corresponding event to at least one of: a memory unit, a computing unit and an output device.

4. The method of claim 3, wherein:
   in the comparing step, the sensor signal is compared in the computing unit to at least one threshold value; and
   upon at least one threshold value has been exceeded, registering a corresponding load exposure and, optionally, taking at least one of the following additional steps:
   calculating the sum of all load exposures; and
   calculating the sum of all load exposures and, by comparing the sum all load exposures to a maximum value of the permissible load exposures, calculating at least one of: a permissible remaining load exposure and a remaining operating life.

5. The method of claim 4, wherein:
   the step of calculating the sum of all load exposures is determined by integrating one of:
   the entire time profile of the sensor signals of the at least one sensor;
   the time profile of the sensor signals of the at least one sensor after a threshold value has been crossed, or
   the time segments during which the sensor signals lie above or below the threshold value; and
   when the maximum value of the permissible load exposures has been exceeded, the method comprises the further step of at least one of:
   storing at least one of: the condition of the force-measuring device or the occurrence of exceeding the maximum value, and
   transmitting to the output device at least one of: the condition of the force-measuring device or the occurrence of exceeding the maximum value.

6. The method of claim 1, comprising the further step of:
   using the sensor signal to cause at least one of the following actions:
   triggering an alarm,
   interrupting a measurement process, and
   cancelling a readiness message.

7. The method of claim 5, comprising the further step of:
   using the sensor signal to cause at least one of the following actions:
   initiating an automatic calibration process of the force-measuring cell, and
   requesting a manual calibration to be performed.

8. The method of claim 1, comprising the further step of:
   validating the at least one sensor by at least periodically checking the sensor signals transmitted to the computing unit by the at least one sensor through the steps of:
   comparing the sensor signals in the computing unit with verification values and verification tolerance values that are stored in the computing unit, and
   if either or both of the verification values and the verification tolerance values are found to be violated, registering an error and transmitting the error to the output device.

9. The method of claim 2, comprising the further step of:
   verifying the integrity of the force-measuring device, after a relocation thereof, through the substeps of:
   obtaining a sensor signal from the sensor after the relocation of the force-measuring device; and
   comparing, in the computing unit, the obtained sensor signal to a reference value stored in the computing unit, the reference value corresponding to a sensor signal obtained from the sensor before the relocation of the force-measuring device.

10. The method of claim 2, comprising the step of:
    supplying electrical current to the sensor, the memory unit and the computing unit through an additional, independent power supply unit.

11. A force-measuring device, comprising:
    a housing having an interior space with at least one force-measuring cell installed therein, the interior space comprising a gas that is distinguishable from the gas of the ambient atmosphere; and
    a sensor, arranged in the interior space or on the housing to measure the thermal conductivity of the composition of the gas contained in the interior space and to generate at least one corresponding sensor signal based on the parameter or parameter change.

12. The force-measuring device of claim 11, further comprising:
    a processing device, arranged to receive the sensor signal, the processing device comprising at least one of: a memory unit, a computing unit and an output device.

13. The force-measuring device of claim 12, further comprising:
    a memory unit in communication with the processing device operating to store at least one of: the sensor signal, a sensor signal generated by the processing device and the registration of at least one event related to at least one of the sensor signal and a sensor signal generated by the processing device.

14. The force-measuring device of claim 11, further comprising:
    a source of electrical power for backing up power to the processing device during loss of power from a primary power source.

15. The force-measuring device of claim 11, further comprising:
    means for isolating the interior space from the ambient atmosphere.

16. The force-measuring device of claim 11, further comprising:
    means for equalizing gas pressure in the interior space with the ambient atmospheric pressure.

17. The force-measuring device of claim 11, wherein:
    the thermal conductivity of the gas composition in the interior space differs from the thermal conductivity of the ambient atmosphere.

18. The force-measuring device of claim 11, wherein:
    the gas composition in the interior space is selected from the group consisting of: argon, helium, and blends thereof.

19. A method for monitoring and/or determining the condition of a force-measuring device having at least one housing that encloses an interior space and with at least one force-measuring cell installed in the interior space, comprising the steps of:

providing the at least one housing with the interior space filled with a gas composition that is distinguishable from the gas composition of the outside atmosphere;

measuring at least one parameter or parameter change of the gas composition in the interior space by at least one sensor that is at least one of: arranged in the interior space and at the housing;

forming a corresponding sensor signal based on the sensor measurement; and verifying the integrity of the force-measuring device, after a relocation thereof, through the substeps of:

obtaining, in a computing unit, a sensor signal from the sensor after the relocation of the force-measuring device; and comparing, in the computing unit, the obtained sensor signal to a reference value stored in the computing unit, the reference value corresponding to a sensor signal obtained from the sensor before the relocation of the force-measuring device.

* * * * *